March 17, 1942. G. PROVENZANO 2,276,700
SAFETY AIRPLANE
Filed Dec. 20, 1939
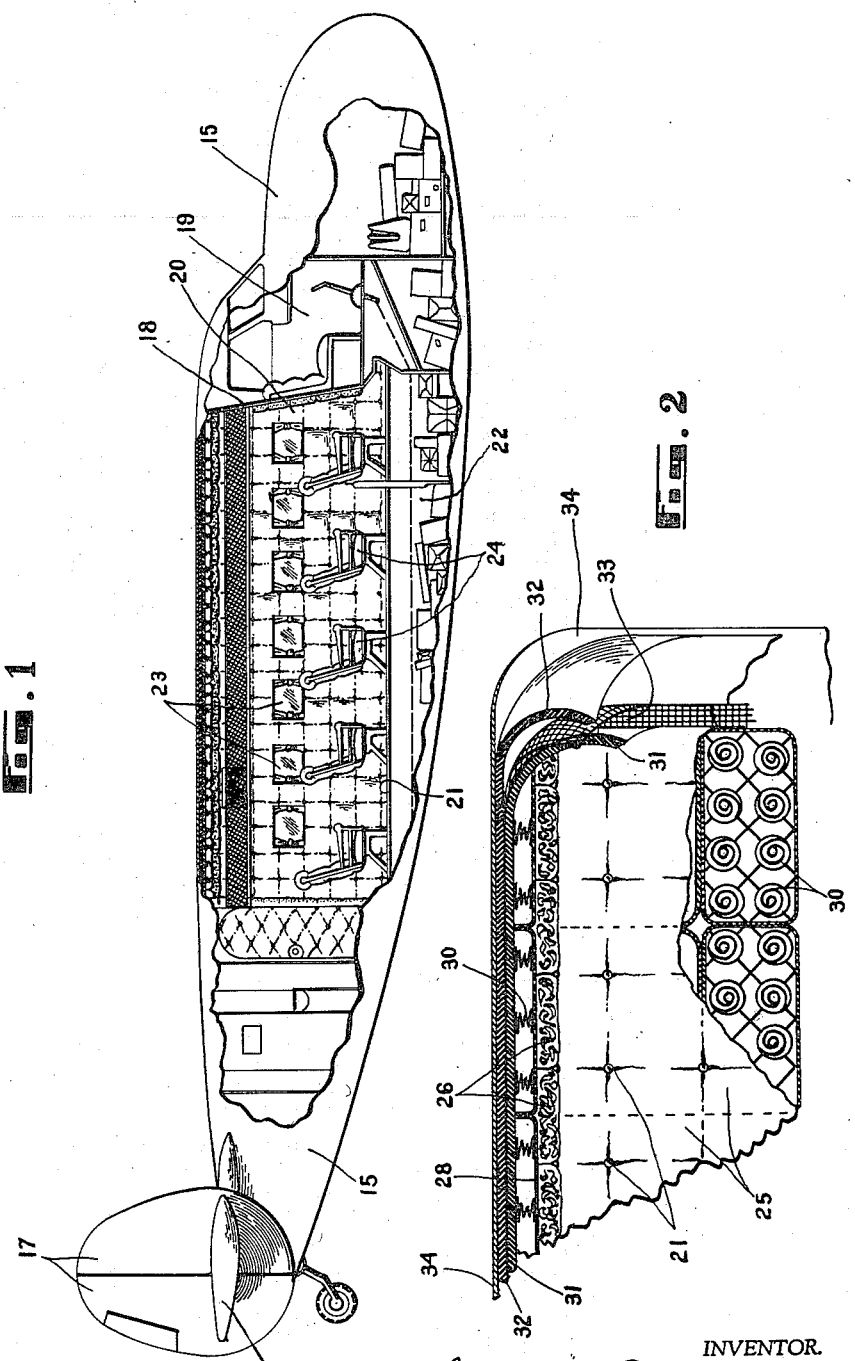
INVENTOR.
Gaetano Provenzano.
BY Marvin
ATTORNEY.

Patented Mar. 17, 1942

2,276,700

UNITED STATES PATENT OFFICE 2,276,700

SAFETY AIRPLANE

Gaetano Provenzano, Greenwich, Conn.

Application December 20, 1939, Serial No. 310,160

1 Claim. (Cl. 89—36)

This invention relates to improvements in air craft of the dirigible flying machine type in which gravitational effect is overcome by wings forced through the air by power driven propellers.

Such airplanes are becoming extensively used for the transportation of passengers, mail, valuable freight, etc., etc., in times of peace and war, but, as well known, are subject to collision with another plane, a fixed object as a cliff, mountain or high building, and also to the hazard of motor failure, damage to parts and the like, whereby the occupants are subjected to possible serious injury and even death.

Having these matters in mind it is an object of the present invention to provide means adapted to minimize the danger by ensheathing the plane body in a resilient armor adapted to at least lessen the damage of a collision.

A further feature is in the provision of shock absorbing devices interposed between the armor and shell body to act as a cushion should impact occur.

These and other analogous aims are attained by the novel construction and arrangement of parts hereinafter described and shown in the annexed drawing, constituting a component of this disclosure, and in which:

Figure 1 is a side elevational view of a conventional type of airplane, its side wing and wall broken away to show an application of the invention.

Figure 2 is an enlarged fragmentary sectional view of the safety devices used.

Referring in greater detail to the drawing, the numeral 15 designates in general the fuselage or body of the structure, having the usual directional rudders 16 and 17 at the tail end.

The wings, whether of the monoplane or biplane type are omitted, also the propellers and motor mechanism, all of which may be of the usual type.

A substantial upright partition 18 extends between the cockpit 19 and passenger compartment 20, the latter having a floor 21 below which is storage space 22 for baggage and freight.

The walls are provided with windows 23 for passengers on seats 24.

The inner surface of the fuselage wall is lined with pillow mattresses 25 filled with feathers 26 and secured at intervals by fastenings 27 fixed in the wall, and completely enclosing the passenger compartment.

Exteriorly of the feather pillows is a layer of rubber sheeting 28, forming the inner covering of a plurality of spiral springs 30, arranged in sections in the manner of bed box springs and overlayed by a thick sheet of rubber 31.

A second, outer rubber sheet 32 is disposed over the sheet 31 and between these sheets is a re-enforcement consisting of a woven wire fabric 33.

Over the outer sheet 32 is a metal plate 34 to receive the impact of a collision, which, transmitted through the dual rubber covering, springs 30, and pillows 25, reduces the shock of the plane when striking an object to a minimum degree.

It will be seen that the thickness of such plurally layered walls is very considerable, but the construction is very light in weight and therefore unobjectionable.

Although the foregoing is descriptive of the best known embodiment of the invention, it will be understood that such changes and modifications may be made as may come within the scope and spirit of the claim hereto appended.

What is claimed as new and sought to secure by Letters Patent is:

An armor for airplanes comprising a metal covering, a two ply rubber sheet interjacent said covering, a woven wire netting intermediate the plies of said sheet, a plurality of springs arranged as a mattress juxtaposed against the inner surface of said sheet, and a cushion lining for said mattress, said cushion lining filled with feathers.

GAETANO PROVENZANO.